United States Patent Office 3,188,176
Patented June 8, 1965

3,188,176
STABILIZATION OF LIQUID SULFUR TRIOXIDE
Everett E. Gilbert, Morristown, and Anthony W. Yodis, Whippany, N.J., assignors to Allied Chemical Corporation, New York, N.Y., a corporation of New York
No Drawing. Filed Mar. 8, 1962, Ser. No. 178,270
12 Claims. (Cl. 23—174)

This invention relates to the stabilization of liquid sulfur trioxide and particularly to the stabilization of liquid sulfur trioxide containing small quantities of $H_2SO_4$.

At room temperature, liquid sulfur trioxide polymerizes to various degrees. The three generally recognized $SO_3$ modifications melt at approximately 17° C., 32.5° C. and 62° C., respectively. On standing at temperature below about 27° C., in the presence of even small amounts of moisture, the form melting at about 17° C. rapidly polymerizes to the higher melting forms. The mass soon becomes solid and must be melted at temperatures up to 100° C., usually under dangerously elevated pressures.

In many industrial applications, it is highly desirable to use $SO_3$ in its strongest available form. However, the foregoing characteristics of liquid sulfur trioxide create marked disadvantages relative to storage, shipment and use of such material. While, for example, liquid sulfur trioxide might be shipped in drums equipped with heating coils, there is involved the problem of supplying a relatively expensive form of container. Moreover, since heat transfer through a solid material is poor, the solidified sulfur trioxide in the container can be melted by the user only with considerable difficulty. In addition to this disadvantage, after relatively long periods of standing, a large proportion of the liquid sulfur trioxide will be polymerized to the high melting forms, in which case complete melting can only be effected by heating at high temperatures under considerable pressures.

Various materials have been added to liquid sulfur trioxide to prevent the formation of solid polymers. Boron trioxide, a highly successful commercial stabilizer, requires subsequent pressure treatment for effective stabilization. Other stabilizers such as dimethyl sulfate fail to stabilize liquid sulfur trioxide containing as little as about 0.01% $H_2SO_4$ (equivalent to about 0.002% $H_2O$).

An object of this invention is to provide stabilized forms of liquid sulfur trioxide which do not polymerize to any substantial degree and remain liquid at room temperature.

Another object of the invention is to provide stabilizing agents which have a high tolerance for moisture, i.e. which are effective for stabilizing liquid sulfur trioxide containing small quantities of sulfuric acid.

A further object of the invention is to provide stabilizing agents which result in a product not requiring subsequent pressure treatment for effective stabilization.

The invention also provides process for accomplishing the foregoing objectives.

According to our invention, it has been found that liquid sulfur trioxide can be stabilized by incorporating therein a stabilizer comprising a phosphorus compound containing a structure selected from the group consisting of

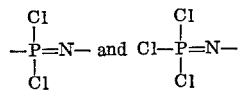

Phosphorus compounds containing the structures defined above are excellent stabilizers for liquid sulfur trioxide with good moisture tolerance. Moreover, they do not require subsequent pressure treatment for effective stabilization.

The preferred phosphorus compounds containing the structure

are phosphonitrilic chloride polymers which possess solubility in liquid sulfur trioxide. These polymers are represented by the formula $(PNCl_2)_x$ wherein X ranges from 3 to 6 and above, preferably from 3 to 4. Specific examples of the polymers are the trimer and phosphonitrilic chloride the tetramer of phosphonitrilic chloride and mixtures thereof.

The preferred phosphorus compounds containing the structure

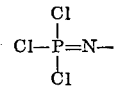

are the chloride of trichlorophosphazosulfamic acid ($ClSO_2NPCl_3$) and bis(trichlorophoshaszo) sulfone ($SO_2(NPCl_3)_2$). Other suitable phosphorus compounds in this category include $CH_3NPCl_3$ and $C_6H_5NPCl_3$.

The phosphonitrilic chloride polymers may be prepared by partial ammonolysis of phosphorus pentachloride, as described on pages 309–311 of Phosphorus and Its Compounds, by Van Wazer, volume 1 (1958). Mixtures of polymers having the composition $(PNCl_2)_x$ wherein X ranges from 3 to 6 and above are obtained which may then be separated by extraction and recrystallization procedures. The mixtures generally contain about 25% by weight of polymers higher than the hexamer.

In a typical procedure, phosphorus pentachloride is reacted with ammonium chloride at temperatures between 145° and 160° C. until hydrogen chloride ceases to evolve. The trimer and tetramer of phosphonitrilic chloride may be extracted from the resulting crude polymer mixture with petroleum ether and fractionally recrystallized from anhydrous benzene.

The reaction between phosphorus pentachloride and ammonium chloride may also be carried out in the presence of an organic solvent, for example, a chlorinated hydrocarbon solvent such as sym.-tetrachloroethane. In this procedure, the reaction mixture is refluxed until hydrogen chloride is driven off. The solvent is then distilled from the resulting crude polymer mixture, and higher polymers are removed from the trimer and tetramer of phosphonitrilic chloride by extraction with cold benzene. After recrystallization from benzene, the trimer and tetramer may be separated by distillation at reduced pressure.

If desired, the stabilizer employed in the present invention may comprise a solution of crude phosphonitrilic chloride polymer mixture in an organic solvent inert to sulfur trioxide such as a chlorinated hydrocarbon solvent, thereby eliminating the necessity for the separation procedure described above. Sym.-tetrachloroethane is typical of the inert organic solvents which may be employed.

The chloride of trichlorophosphazosulfamic acid may be prepared by reacting phosphorus pentachloride with sulfamic acid, as described in Chemical Abstracts, volume 46 (1952), column 6984.

Bis(trichlorophosphazo) sulfone may be prepared by reacting phosphorus pentachloride with sulfamide, as described in Chemical Abstracts, volume 47 (1953), column 5836.

$CH_3NPCl_3$ may be prepared by the reaction of methyl ammonium chloride and phosphorus pentachloride (Advances in Inorganic and Radiochemistry, volume 1 (1959), page 353).

$C_6H_5NPCl_3$ (trichlorophosphanil) may be prepared by reacting phosphorus pentachloride and aniline hydrochloride, as described in American Chemical Journal, volume 19 (1897), pages 354–355.

The liquid sulfur trioxide to be stabilized may be obtained from any source. For example, liquid $SO_3$ may be obtained commercially by distilling oleum under conditions to avoid vaporization of $H_2SO_4$ and condensing the $SO_3$ gas at temperature of about 20–30° C. Similarly, liquid sulfur trioxide may be obtained from the mist-free $SO_3$ gas exiting a catalytic $SO_2$ oxidation operation by compressing the gas to about 160–170 pounds per square inch and cooling the compressed gas to temperature of about 20–25° C., under which conditions about 70% of the $SO_3$ may be liquefied and recovered as liquid sulfur trioxide. Liquid sulfur trioxide so produced generally contains about 0.01 to 0.1% $H_2SO_4$ but may contain as much as 0.2% $H_2SO_4$. Although our invention is particularly concerned with stabilization of such commercial forms of liquid sulfur trioxide, stabilization of completely anhydrous liquid sulfur trioxide represents an important embodiment of the invention.

The quantity of phosphorus compound employed in practice depends upon the degree of inhibition desired, as well as upon the $H_2SO_4$ content of the sulfur trioxide. Thus, as the amount of $H_2SO_4$ present in the sulfur trioxide increases, larger quantities of the phosphorus compound are required for effective stabilization. Although, for reasons of economy, it is preferred to use as small quantites as possible of the phosphorus compound, satisfactory stabilization is realized with much larger quantities, for example, up to the limit of solubility of the phosphorus compound in the liquid sulfur trioxide. The phosphorus compound is generally added to the sulfur trioxide in amount of about 0.05 to 1.0% by weight of the sulfur trioxide, the preferred amount ranging from about 0.1 to 0.25% by weight of the sulfur trioxide.

Although subsequent pressure treatment may enhance the stability of the sulfur trioxide product, the treatment is unnecessary to obtain effectively stabilized sulfur trioxide. Such pressure treatment, when used, may be conducted at temperature of 60° to 100° C. for a period of about 2 to 10 hours.

The stabilizer may be added in any known manner. For example, it may be added directly to the liquid sulfur trioxide and dissolved by agitation. Alternatively, sulfur trioxide vapors may be condensed in a closed vessel in which the stabilizer has been previously placed.

Liquid sulfur trioxide stabilized by the process of this invention remains perfectly liquid at room temperature, even after storage for long periods. If it is frozen, it forms a solid which, when thawed at room temperature, readily liquefies again.

The following examples illustrate practice of our invention, parts being by weight.

EXAMPLE 1

In the tests set forth in Table 1 below, liquid sulfur trioxide was mixed with various phosphonitrilic chloride polymers as stabilizers, and the samples were placed into ampoules and sealed to exclude extraneous moisture contamination. The samples were frozen at −10° C. and thawed at room temperature for several cycles.

Table 1

| Stabilizer | Percent Stabilizer by Weight of $SO_3$ | Percent $H_2SO_4$ in $SO_3$ | Percent Polymerization per Freeze-Thaw Cycle | | | |
|---|---|---|---|---|---|---|
| | | | 1 | 2 | 3 | 4 |
| Phosphonitrilic Chloride Trimer | 1.05 | 0 | 0 | 0 | 0 | 0 |
| Phosphonitrilic Chloride Trimer (80%)—Tetramer (20%) Mixture | 0.91 | 0 | 0 | 0 | 0 | 0 |
| Phosphonitrilic Chloride Trimer | 0.23 | 0 | 0 | 0 | 0 | 0 |
| Phosphonitrilic Chloride Trimer (80%)—Tetramer (20%) Mixture | 0.23 | 0 | 0 | 0 | 0 | 0 |
| Phosphonitrilic Chloride Trimer | 0.10 | 0 | 0 | 0 | 0 | 0 |
| Phosphonitrilic Chloride Trimer (80%)—Tetramer (20%) Mixture | 0.10 | 0 | 0 | 0 | 0 | Trace |
| Phosphonitrilic Chloride Trimer | 0.35 | 0.05 | 0 | 0 | 0 | 0 |
| Phosphonitrilic Chloride Trimer (80%)—Trimer (20%) Mixture | 0.35 | 0.05 | 0 | 0 | 0 | 0 |

EXAMPLE 2

The data set forth in Table 2 below show the use of 10% solutions of phosphonitrilic chloride polymer mixtures in sym.-tetrachloroethane as stabilizers for liquid sulfur trioxide. These tests were carried out as described in Example 1.

Table 2

| Percent Stabilizer by Weight of $SO_3$ | Percent $H_2SO_4$ in $SO_3$ | Percent Polymerized per Freeze-Thaw Cycle | | | |
|---|---|---|---|---|---|
| | | 1 | 2 | 3 | 4 |
| 1.11 | 0 | 0 | 0 | 0 | 0 |
| 0.11 | 0 | 0 | 0 | 0 | 0 |
| 1.92 | 0.049 | 0 | 0 | 0 | 0 |
| 1.88 | 0.097 | 0 | 0 | 0 | 0 |
| 1.22 | 0.045 | 0 | 0 | 0 | 0 |
| 1.03 | 0.048 | 0 | 0 | 0 | 0 |
| 0.87 | 0.045 | 0 | 0 | 0 | 0 |

EXAMPLE 3

In the same manner as described in Example 1, the chloride of trichlorophosphazosulfamic acid and bis(trichlorophosphazo) sulfone were used as stabilizers for liquid sulfur trioxide. The data obtained are set forth in Table 3 below:

Table 3

| Stabilizer | Percent Stabilizer by Weight of $SO_3$ | Percent $H_2SO_4$ in $SO_3$ | Percent Polymerized per Freeze-Thaw Cycle | | | |
|---|---|---|---|---|---|---|
| | | | 1 | 2 | 3 | 4 |
| Bis(Trichlorophosphazo) Sulfone | 1.05 | 0 | 0 | 0 | 0 | 0 |
| Do | 0.26 | 0 | 0 | 0 | 0 | 0 |
| Do | 0.12 | 0 | 0 | 0 | 0 | 0 |
| Chloride of Trichlorophosphazosulfamic Acid | 1.11 | 0 | 0 | 0 | 0 | 0 |
| Do | 0.24 | 0 | 0 | 0 | 0 | 0 |
| Do | 0.11 | 0 | 0 | 0 | 0 | 0 |

Although we have described preferred embodiments of the present invention, the invention is deemed to be limited only by the scope of the appended claims.

We claim:
1. A composition consisting of liquid sulfur trioxide and a stabilizing amount of a member of the group con- sisting of phosphonitrilic chloride polymers represented by the formula $(PNCl_2)_x$ wherein $x$ is 3 to 6, the chloride of trichlorophosphazosulfamic acid, bis(trichlorophosphazo) sulfone, $CH_3NPCl_3$ and $C_6H_5NPCl_3$.

2. A composition consisting of liquid sulfur trioxide and a stabilizing amount of a phosphonitrilic chloride polymer represented by the formula $(PNCl_2)_x$ wherein $x$ is an integer from 3 to 6.

3. A composition consisting of liquid sulfur trioxide and a stabilizing amount of a member selected from the group consisting of phosphonitrilic chloride trimer, phosphonitrilic chloride tetramer and mixtures thereof.

4. A composition consisting of liquid sulfur trioxide and a stabilizing amount of a mixture of phosphonitrilic chloride polymers represented by the formula $(PNCl_2)_x$ wherein $x$ is at least 3 and predominantly 3 to 6 in an organic solvent inert to sulfur trioxide.

5. A composition consisting of liquid sulfur trioxide and a stabilizing amount of the chloride of trichlorophosphazosulfamic acid.

6. A composition consisting of liquid sulfur trioxide and a stabilizing amount of bis(trichlorophosphazo) sulfone.

7. A composition consisting of liquid sulfur trioxide containing about 0.01 to 0.1% $H_2SO_4$ and a stabilizing amount of a member of the group consisting of phosphonitrilic chloride polymers represented by the formula $(PNCl_2)_x$ wherein $x$ is 3 to 6, the chloride of trichlorophosphazosulfamic acid, bis(trichlorophosphazo) sulfone, $CH_3NPCl_3$ and $C_6H_5NPCl_3$, said amount being about 0.05 to 1.0% by weight of the sulfur trioxide.

8. The method of stabilizing liquid sulfur trioxide which comprises incorporating in said sulfur trioxide a stabilizing amount of a member of the group consisting of phosphonitrilic chloride polymers represented by the formula $(PNCl_2)_x$ wherein $x$ is 3 to 6, the chloride of trichlorophosphazosulfamic acid, bis(trichlorophosphazo) sulfone, $CH_3NPCl_3$ and $C_6H_5NPCl_3$.

9. The method of stabilizing liquid sulfur trioxide which comprises incorporating in said sulfur trioxide a stabilizing amount of a phosphonitrilic chloride polymer.

10. The method of stabilizing liquid sulfur trioxide which comprises incorporating in said sulfur trioxide a stabilizing amount of a member selected from the group consisting of phosphonitrilic chloride trimer, phosphonitrilic chloride tetramer and mixtures thereof.

11. The method of stabilizing liquid sulfur trioxide which comprises incorporating in said sulfur trioxide a stabilizing amount of a mixture of phosphonitrilic chloride polymers represented by the formula $(PNCl_2)_x$ wherein $x$ is at least 3 and predominantly 3 to 6 in an organic solvent inert to sulfur trioxide.

12. The method of stabilizing liquid sulfur trioxide containing about 0.01 to 0.1% $H_2SO_4$ which comprises incorporating in said sulfur trioxide a stabilizing amount of a member of the group consisting of phosphonitrilic chloride polymers represented by the formula $(PNCl_2)_x$ wherein $x$ is 3 to 6, the chloride of trichlorophosphazosulfamic acid, bis(trichlorophosphazo) sulfone, $$CH_3NPCl_3 \text{ and } C_6H_5NPCl_3$$

said amount being about 0.05 to 1.0% by weight of the sulfur trioxide.

References Cited by the Examiner
UNITED STATES PATENTS

| | | | |
|---|---|---|---|
| 2,872,290 | 2/59 | Blanchard | 23—174 |
| 2,986,450 | 5/61 | Jones et al. | 23—174 |

MAURICE A. BRINDISI, *Primary Examiner.*

ANTHONY SCHIAMANA, *Examiner.*

---

UNITED STATES PATENT OFFICE
CERTIFICATE OF CORRECTION

Patent No. 3,188,176            June 8, 1965

Everett E. Gilbert et al.

It is hereby certified that error appears in the above numbered patent requiring correction and that the said Letters Patent should read as corrected below.

Column 2, line 17, for "and" read -- of --; line 18, after "chloride", first occurrence, insert a comma; same column 2, line 41, for "temperatures" read -- temperature --; column 4, Table 1, first column, second line from the bottom of the column, for "Trimer" read -- Tetramer --; column 6, line 5, after "polymer" insert -- represented by the formula $(PNCl_2)_x$ wherein x is an integer from 3 to 6 --.

Signed and sealed this 16th day of November 1965.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,188,176                      June 8, 1965

Everett E. Gilbert et al.

It is hereby certified that error appears in the above numbered patent requiring correction and that the said Letters Patent should read as corrected below.

Column 2, line 17, for "and" read -- of --; line 18, after "chloride", first occurrence, insert a comma; same column 2, line 41, for "temperatures" read -- temperature --; column 4, Table 1, first column, second line from the bottom of the column, for "Trimer" read -- Tetramer --; column 6, line 5, after "polymer" insert -- represented by the formula $(PNCl_2)_x$ wherein x is an integer from 3 to 6 --.

Signed and sealed this 16th day of November 1965.

SEAL)

test:

RNEST W. SWIDER
testing Officer

EDWARD J. BRENNER
Commissioner of Patents